(12) United States Patent
Mitadera et al.

(10) Patent No.: US 9,334,365 B2
(45) Date of Patent: May 10, 2016

(54) POLYAMIDE RESIN MOLDINGS

(75) Inventors: Jun Mitadera, Kanagawa (JP); Masashi Kurokawa, Kanagawa (JP); Takahiro Takano, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 167 days.

(21) Appl. No.: 13/822,152

(22) PCT Filed: Sep. 29, 2011

(86) PCT No.: PCT/JP2011/072396
§ 371 (c)(1),
(2), (4) Date: Mar. 11, 2013

(87) PCT Pub. No.: WO2012/046629
PCT Pub. Date: Apr. 12, 2012

(65) Prior Publication Data
US 2013/0172460 A1    Jul. 4, 2013

(30) Foreign Application Priority Data

Oct. 8, 2010 (JP) ................................. 2010-228509

(51) Int. Cl.
| | |
|---|---|
| C08G 69/08 | (2006.01) |
| C08G 69/26 | (2006.01) |
| C08G 69/06 | (2006.01) |
| C08L 77/10 | (2006.01) |
| C08G 18/60 | (2006.01) |
| C08L 77/06 | (2006.01) |
| C08K 5/29 | (2006.01) |

(52) U.S. Cl.
CPC .............. *C08G 69/26* (2013.01); *C08G 18/603* (2013.01); *C08G 69/06* (2013.01); *C08G 69/265* (2013.01); *C08K 5/29* (2013.01); *C08L 77/06* (2013.01); *C08L 77/10* (2013.01); *C08J 2377/06* (2013.01)

(58) Field of Classification Search
CPC ...... C08L 77/10; C08G 69/26; C08G 18/603; C08J 2377/06
See application file for complete search history.

(56) References Cited

U.S. PATENT DOCUMENTS

| | | | |
|---|---|---|---|
| 4,822,846 | A | 4/1989 | Nomura et al. |
| 5,001,219 | A | 3/1991 | Chern et al. |
| 5,576,415 | A * | 11/1996 | Tanaka ........................... 528/310 |
| 2009/0169882 | A1 * | 7/2009 | Jandris et al. ................. 428/373 |
| 2010/0004406 | A1 | 1/2010 | Sato |
| 2011/0224370 | A1 | 9/2011 | Kanda et al. |
| 2013/0066041 | A1 | 3/2013 | Mitadera et al. |
| 2013/0078402 | A1 | 3/2013 | Mitadera et al. |
| 2013/0123439 | A1 | 5/2013 | Mitadera et al. |

FOREIGN PATENT DOCUMENTS

| | | |
|---|---|---|
| CN | 101528854 A | 9/2009 |
| EP | 0 272 503 A1 | 6/1988 |
| EP | 0 703 264 A2 | 3/1996 |
| EP | 0 703 264 A3 | 3/1996 |
| EP | 2 078 735 A1 | 7/2009 |
| JP | 60 217237 | 10/1985 |
| JP | 63 137956 | 6/1988 |
| JP | 3 262633 | 11/1991 |
| JP | 5 5056 | 1/1993 |
| JP | 2001 302845 | 10/2001 |
| JP | 2003 119375 | 4/2003 |
| JP | 2003 252987 | 9/2003 |
| JP | 2008 133455 | 6/2008 |
| JP | 2009 255417 | 11/2009 |
| WO | WO 2010/032719 A1 | 3/2010 |

OTHER PUBLICATIONS

Khanna et al "Measurement of Crystalline Index in Nylons by DSC: Complexities and Recommendations" Journal of Polymer Science: Part B: Polymer Physics, vol. 35, 2219-2231 (1997), Jul. 1997.*
International Preliminary Report on Patentability and Written Opinion issued May 16, 2013 in PCT/JP2011/072396 with English Translation.
U.S. Appl. No. 13/824,027, filed Mar. 15, 2013, Mitadera, et al.
International Search Report Issued Dec. 20, 2011 in PCT/JP11/72396 Filed Sep. 29, 2011.
Combined Chinese Office Action and Search Report issued Feb. 13, 2014 in Patent Application No. 201180048322.8 (with English translation of the Office Action and English translation of categories of cited documents).
Extended European Search Report issued Apr. 4, 2014 in Patent Application No. 11830561.4.
Office Action issued Nov. 22, 2013 in Australian Patent Application No. 2011313399.
U.S. Appl. No. 13/885,444, filed May 15, 2013, Mitadera.
U.S. Appl. No. 14/528,063, filed Oct. 30, 2014, Mitadera.
B. A. Zhubanov et al., "Studies in Polymer Synthesis-XII. Mixed Polyamides Based on *P*-Xylylenediamine Sebacic, Amino-Oenanthic and Amino-Undecanoic Acids", Vysokomol. Boyea. 5: No. 9, 1963, pp. 1325-1328.
Office Action issued Jul. 20, 2015, in Russian Patent Application No. 2013120548/04(030476), filed May 6, 2013 (with English-language translation).
B. A. Zhubanov et al., "Studies in Polymer Synthesis-XII. Mixed Polyamides Based on *p*-Xylylenediamine Sebacic, Amino-Oenanthic and Amino-Undecanoic Acids", Vysokomol. Boyea. 5: No. 9, 1963, pp. 1325-1328 (English translation only).

* cited by examiner

*Primary Examiner* — Gregory Listvoyb

(74) *Attorney, Agent, or Firm* — Oblon, McClelland, Maier & Neustadt, L.L.P.

(57) ABSTRACT

Provided is a xylylenesebacamide resin molding which is excellent in mechanical strength such as elastic modulus and avoids the problem of mechanical strength loss during long-term use. This is a molding of a polyamide resin or a polyamide resin composition containing the polyamide resin, wherein 70 mol % or more of the diamine structural unit is derived from xylylenediamine (A) and 50 mol % or more of the dicarboxylic acid structural unit is derived from sebacic acid (B), and the molding has a crystallinity index of 0 to 50% and a moisture content of 0.1 to 2% by mass.

10 Claims, No Drawings

POLYAMIDE RESIN MOLDINGS

TECHNICAL FIELD

The present invention relates to polyamide resin moldings, specifically xylylene sebacamide-based polyamide resin moldings having excellent mechanical strength such as elastic modulus and free from the problem of mechanical strength loss during long-term use.

BACKGROUND ART

Polyamide resins are widely used as engineering plastics having excellent mechanical strength such as impact resistance and friction/abrasion resistance as well as excellent heat resistance and oil resistance in the fields of automotive parts, electronic/electric equipment parts, office automation equipment parts, machine parts, construction materials/housing parts and the like, and recently have found increasingly wide applications.

Known polyamide resins include polyamide 6, polyamide 66, polyamide 610 and the like. Generally, polyamide resins had the disadvantage that their mechanical properties such as flexural rigidity and elastic modulus decrease when they absorb water, and more specifically, polyamide resins such as polyamide 6, polyamide 66 and polyamide 610 had the disadvantage that their elastic modulus decreases as they absorb water, which results in their limited field of application and low reliability for long-term use.

Further, m-xylylene adipamide (hereinafter sometimes referred to as "MXD6") derived from m-xylylenediamine and adipic acid is also known and positioned as a very excellent polyamide resin because it contains an aromatic ring in the main chain unlike the polyamide resins described above so that it has high rigidity and it is also suitable for precision molding, and therefore, MXD6 has recently been more widely used as a molding material, especially as an injection molding material in various fields including parts of vehicles such as automobiles, general machine parts, precision machine parts, electronic/electric equipment parts, leisure/sports goods, civil engineering and construction materials, etc.

However, MXD6 also suffers from a decrease in elastic modulus due to wetting, which results in its limited field of application but to a lesser extent than polyamide 6, polyamide 66 and polyamide 610.

Lighter and stronger polyamide resin materials are also needed and a known xylylene polyamide resin lighter than MXD6 includes a xylylene sebacamide-based polyamide resin derived from xylylenediamine and sebacic acid (hereinafter sometimes referred to as "XD10") (see patent document 1), which has been highly expected as a high-performance polyamide resin. However, this XD10 may also cause the problems due to wetting as described above.

REFERENCES

Patent Documents

Patent document 1: JP-A S63-137956.

SUMMARY OF THE INVENTION

Problems to be Solved by the Invention

An object of the present invention is to overcome the problems described above and to provide a xylylene sebacamide-based polyamide resin molding having excellent mechanical strength such as elastic modulus and free from the problem of mechanical strength loss during long-term use.

Means for Solving the Problems

As a result of careful studies to obtain a xylylene sebacamide-based polyamide resin molding having excellent mechanical strength and free from the problem of strength loss even during long-term use, we surprisingly found that the above object can be attained by controlling the crystallinity index and moisture content of the molding at specific values without relying on additives and finally accomplished the present invention. Accordingly, the present invention provides the following polyamide resin moldings.

[1] A polyamide resin molding, which is formed from a polyamide resin comprising a diamine structural unit and a dicarboxylic acid structural unit or a polyamide resin composition containing the polyamide resin,
wherein 70 mol % or more of the diamine structural unit is derived from xylylenediamine (A) and 50 mol % or more of the dicarboxylic acid structural unit is derived from sebacic acid (B), and which has a crystallinity index of 0 to 50% and a moisture content of 0.1 to 2% by mass.

[2] The polyamide resin molding according to [1], wherein xylylenediamine (A) is m-xylylenediamine, p-xylylenediamine or a mixture thereof.

[3] The polyamide resin molding according to [1], wherein the polyamide resin has a number average molecular weight of 8,000 to 50,000.

[4] The polyamide resin molding according to [1], wherein the polyamide resin composition contains 0.1 to 2 parts by mass of a carbodiimide compound (C) per 100 parts by mass of the polyamide resin.

[5] The polyamide resin molding according to [1], which is a film, sheet, thread, tube or injection-molded article.

[6] The polyamide resin molding according to [1], which is formed in such a manner that an inlet temperature (Tin) and an outlet temperature (Tout) of a cylinder in which the polyamide resin or polyamide resin composition containing the polyamide resin is melted satisfy the relation (1) below:

$$Tout \geq Tin + 20° C. \quad (1).$$

[7] The polyamide resin molding according to [6], wherein the inlet temperature (Tin) and the outlet temperature (Tout) of the cylinder satisfy the relations (2) and (3) below with the melting point (Tm) of the polyamide resin:

$$Tm + 60° C. \geq Tout \geq Tm + 10° C. \quad (2)$$

$$Tm + 40° C. \geq Tin \geq Tm - 50° C. \quad (3).$$

Advantages of the Invention

The xylylene sebacamide-based polyamide resin moldings of the present invention have excellent mechanical strength such as elastic modulus and avoid the problem of mechanical strength loss during long-term use so that they have excellent reliability during long-term use. Thus, they can be conveniently used as various moldings including various films, sheets, laminated films, laminated sheets, tubes, hoses, pipes, various containers such as hollow containers and bottles, various electric/electronic equipment parts and the like.

THE BEST MODE FOR CARRYING OUT THE INVENTION

[Polyamide Resins]

Polyamide resins used in the present invention comprise a diamine structural unit and a dicarboxylic acid structural unit wherein 70 mol % or more of the diamine structural unit is derived from xylylenediamine (A) and 50 mol % or more of the dicarboxylic acid structural unit is derived from sebacic acid (B).

The diamine unit forming part of the polyamide resins must contain 70 mol % or more, preferably 80 mol % or more, more preferably 90 mol % or more of a xylylenediamine unit. The polyamide resins can achieve excellent elastic modulus and gas barrier properties by containing 70 mol % or more of a xylylenediamine unit in the diamine unit.

Xylylenediamine (A) used preferably includes m-xylylenediamine, p-xylylenediamine or a mixture thereof. The melting point and glass transition point, heat resistance and crystallization rate of the polyamide resins can be improved by combining m-xylylenediamine with p-xylylenediamine as diamine components.

For the purpose of improving the crystallization rate of the polyamide resins, p-xylylenediamine in the diamine structural unit is preferably 20 mol % or more, more preferably 30 mol % or more, even more preferably 40 mol % or more, especially preferably 60% or more.

For the purpose of improving the flexibility of the polyamide resins, m-xylylenediamine in the diamine structural unit is preferably 70 mol % or more, more preferably 80 mol % or more even more preferably 90% or more.

Examples of compounds that can constitute diamine units other than m-xylylenediamine and p-xylylenediamine units may include, but not limited to, aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine and 2,4,4-trimethylhexamethylenediamine;

alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl) methane, 2,2-bis(4-aminocyclohexyl)propane, bis (aminomethyl)decane and bis(aminomethyl)tricyclodecane; and diamines having an aromatic ring such as bis(4-aminophenyl) ether, p-phenylenediamine and bis(aminomethyl)naphthalene, etc.

On the other hand, 50 mol % or more of the dicarboxylic acid structural unit forming part of the polyamide resins used in the present invention must be sebacic acid (B). If the amount of sebacic acid (B) is less than 50 mol % in the dicarboxylic acid structural unit, the resulting polyamide resin moldings have high moisture content and high water absorption (hygroscopy). The density also increases so that the resulting polyamide resin moldings have large weights. The decrease in elastic modulus during wetting of the polyamide resin moldings can be reduced by including 50 mol % or more of sebacic acid (B). Higher amounts of sebacic acid allow weight reduction. The amount of sebacic acid is preferably 75 to 100 mol %, more preferably 90 to 100 mol %.

Such sebacic acid (B) is preferably derived from a plant. Polyamide resins containing plant-derived sebacic acid (B) as a structural unit resist yellowing without adding any antioxidant and the resulting moldings also have a low yellowness index (YI) because plant-derived sebacic acid contains impurities such as sulfur compounds and sodium compounds. Plant-derived sebacic acid (B) is preferably used without excessively purifying impurities. The elimination of the necessity of excessive purification is also advantageous in terms of cost.

Sebacic acid (B) here preferably has a sulfur atom concentration of 1 to 200 ppm, more preferably 10 to 150 ppm, especially preferably 20 to 100 ppm. When it is in the above ranges, the increase in YI can be reduced during the synthesis of the polyamide resins. The increase in YI during melt molding of the polyamide resins can also be reduced so that the YI of the resulting polyamide resin moldings can be decreased.

Sebacic acid (B) also preferably has a sodium atom concentration of 1 to 500 ppm, more preferably 10 to 300 ppm, especially preferably 20 to 200 ppm. When it is in the above ranges, the polyamide resins can be synthesized with good reactivity and readily controlled in an appropriate molecular weight range. Moreover, the increase in viscosity during melt molding of the polyamide resins can be reduced so that moldability improves and char can be prevented during molding processes, whereby the resulting moldings tend to have good quality. Additionally, the polyamide resins tend to be less likely to generate die buildup such as the so-called die bleed when they are compounded with a glass filler or the like.

The purity of plant-derived sebacic acid (B) is preferably 99 to 100% by mass, more preferably 99.5 to 100% by mass, even more preferably 99.6 to 100% by mass. These ranges are preferred, because the resulting polyamide resins have good quality and polymerization is not affected.

For example, the amount of dicarboxylic acids such as 1,10-decamethylenedicarboxilic acid contained in sebacic acid (B) is preferably 0 to 1% by mass, more preferably 0 to 0.7% by mass, even more preferably 0 to 0.6% by mass. These ranges are preferred, because the resulting polyamide resins have good quality and polymerization is not affected.

The amount of monocarboxylic acids such as octanoic acid, nonanoic acid and undecanoic acid contained in sebacic acid (B) is preferably 0 to 1% by mass, more preferably 0 to 0.5% by mass, even more preferably 0 to 0.4% by mass. These ranges are preferred, because the resulting polyamide resins have good quality and polymerization is not affected.

The hue (APHA) of sebacic acid (B) is preferably 100 or less, more preferably 75 or less, even more preferably 50 or less. These ranges are preferred, because the resulting polyamide resins have a low YI. As used herein, APHA can be determined by the Standard Methods for the Analysis of Fats, Oils and Related Materials defined by the Japan Oil Chemist's Society.

Dicarboxylic acid components other than sebacic acid (B) that can be used for the preparation of the polyamide resins preferably include dicarboxylic acid components based on other straight chain aliphatic α,ω-dicarboxylic acids containing 4 to 20 carbon atoms, e.g., aliphatic dicarboxylic acids such as adipic acid, succinic acid, glutaric acid, pimelic acid, suberic acid, azelaic acid, undecanoic diacid, dodecanoic diacid and the like. Among them, adipic acid, undecanoic diacid, dodecanoic diacid and the like are preferably used as dicarboxylic acid components other than sebacic acid, if they are present, and adipic acid is especially preferred. Elastic modulus, water absorption and crystallinity index can be readily controlled by additionally including adipic acid. The amount of adipic acid is more preferably 40 mol % or less, even more preferably 30 mol % or less.

Polyamide resins additionally containing undecanoic diacid or dodecanoic diacid are also preferred because they have lower specific gravity and the resulting moldings have lower weight. The proportion of straight chain aliphatic α,ω- dicarboxylic acids containing 4-20 carbon atoms other than sebacic acid is less than 50 mol %, preferably 40 mol % or less, if they are used.

Aromatic dicarboxylic acids such as terephthalic acid, isophthalic acid and 2,6-naphthalenedicarboxylic acid may also be used, and they may be used in combination.

In addition to the diamine components and dicarboxylic acid components, lactams such as ε-caprolactam and laurolactam or aliphatic aminocarboxylic acids such as aminocaproic acid and aminoundecanoic acid may also be used as components to be copolymerized to make up the polyamide resins so far as the benefits of the present invention are not affected.

The process for preparing the polyamide resins used in the present invention is not specifically limited, but any processes and polymerization conditions can be used. For example, the polyamide resins can be prepared by heating a salt composed of a diamine (e.g., xylylenediamine) and a dicarboxylic acid (e.g., sebacic acid) under pressure in the presence of water to polymerize it in the molten state while removing the added water and condensed water.

The polyamide resins can also be prepared by directly adding a diamine (e.g., xylylenediamine) to a dicarboxylic acid (e.g., sebacic acid) in the molten state to polycondense them at atmospheric pressure. In the latter case, polycondensation proceeds by continuously adding the diamine to the dicarboxylic acid while heating the reaction system to a reaction temperature not lower than the melting points of the oligoamide and polyamide produced to maintain the reaction system in a homogeneous liquid state. During polycondensation of the polyamide resins, a small amount of a monoamine or monocarboxylic acid may be added as a molecular weight modifier.

The polyamide resins used in the present invention can also be used after they are further heat-treated to increase their melt viscosity.

Heat treatment methods include, for example, gently heating in the presence of water in an inert gas atmosphere or under reduced pressure using a batch heater such as a rotating drum to induce crystallization while avoiding fusion, and then further heating; or heating in an inert gas atmosphere using a groove stirrer/heater to induce crystallization, and then heating in an inert gas atmosphere using a hot bar heater; or using a groove stirrer/heater to induce crystallization, and then heating with a batch heater such as a rotating drum.

Especially, crystallization and heat treatments preferably take place by using a batch heater. Preferred conditions for crystallization treatment are as follows: heating a polyamide resin obtained by melt polymerization to 70 to 120° C. over 0.5 to 4 hours in the presence of 1 to 30% by mass of water to crystallize it, then heating the crystallized resin at a temperature in the range from [the melting point of the polyamide resin obtained by melt polymerization minus 50° C.] to [the melting point of the polyamide resin obtained by melt polymerization minus 10° C.] for 1 to 12 hours in an inert gas atmosphere or under reduced pressure.

The number average molecular weight of the polyamide resins used in the present invention is preferably 8,000 to 50,000, more preferably 10,000 to 45,000, even more preferably 12,000 to 40,000. If it is less than 8,000, mechanical properties such as impact strength of the polyamide resins may decrease, but if it is more than 50,000, the YI of the polyamide resins may increase because excessive thermal history must be applied during the synthesis of the polyamide resins. When it is in the above ranges, the resins flow well during molding processes so that they are prevented from staying in the machine and the resulting moldings may have better quality with little inclusions such as char.

The number average molecular weight of a polyamide resin is calculated from the equation below:

$$\text{Number average molecular weight} = 2 \times 1000000 / ([\text{COOH}] + [\text{NH}_2])$$

wherein [COOH] represents the terminal carboxyl group concentration in the polyamide resin (μmol/g), and [NH$_2$] represents the terminal amino group concentration in the polyamide resin (μmol/g).

As used herein, the terminal amino group concentration refers to the value calculated from neutralization titrations of a solution of a polyamide resin dissolved in a phenol/ethanol mixed solution with a dilute aqueous hydrochloric acid solution, and the terminal carboxyl group concentration refers to the value calculated from neutralization titrations of a solution of a polyamide resin dissolved in benzyl alcohol with an aqueous sodium hydroxide solution.

The melting point of the polyamide resins used in the present invention is preferably controlled in the range of 150° C. to 300° C., more preferably 160 to 290° C., even more preferably 170 to 290° C., especially preferably 180 to 290° C. The melting point is preferably controlled in the above ranges because processability tends to improve.

The glass transition point of the polyamide resins used in the present invention is preferably in the range of 50 to 130° C. The glass transition point is preferably controlled in the above range because barrier properties tend to improve.

As used herein, the melting point and glass transition point of a polyamide resin refer to the melting point and glass transition point that can be determined by differential scanning calorimetry (DSC) by melting a sample by heating it once to eliminate the influence of thermal history on crystallinity and then heating it again. Specifically, a test sample is melted by heating from 30° C. to a temperature equal to or higher than an expected melting point at a rate of 10° C./min in a nitrogen atmosphere, then held at that temperature for 2 minutes and then rapidly cooled with liquid nitrogen or dry ice. Then, the sample is heated to a temperature equal to or higher than the melting point at a rate of 10° C./min, whereby the melting point and glass transition point can be determined.

The polyamide resins used in the present invention also preferably have a terminal amino group concentration of less than 100 μeq/g, more preferably 5 to 75 μeq/g, even more preferably 10 to 50 μeq/g and preferably have a terminal carboxyl group concentration of less than 200 μeq/g, more preferably 10 to 150 μeq/g, even more preferably 50 to 130 μeq/g. Those having a terminal amino group concentration and a terminal carboxyl group concentration in the above ranges tend to show stable viscosity during molding processes and improve processability. Polyamide resins having a terminal carboxyl group concentration or terminal amino group concentration in the above ranges are preferred, because they also tend to show good reactivity with the carbodiimide compounds described later when such carbodiimide compounds are added so that the resulting moldings have excellent properties such as heat aging resistance and hydrolysis resistance.

The polyamide resins used in the present invention also preferably have a molar ratio of reacted diamine to reacted dicarboxylic acid (the number of moles of reacted diamine/the number of moles of reacted dicarboxylic acid) of 0.98 to 1.1, more preferably 0.985 to 1.0, even more preferably 0.99 to 0.999. Reaction molar ratios outside the range of 0.98 to 1.1 are not preferred because the number average molecular weight of the polyamide resins is less likely to increase. Reaction molar ratios more than 1.1 are not preferred, either, because the polyamide resins have excessive terminal amino groups, inviting a tendency to increase the haze of the resulting moldings or to increase the possibility of producing gelled materials.

The reaction molar ratio (r) here is determined by the equation below:

$$r=(1-cN-b(C-N))/(1-cC+a(C-N))$$

wherein:
a: $M_1/2$
b: $M_2/2$
c: 18.015
$M_1$: the molecular weight of the diamine (g/mol)
$M_2$: the molecular weight of the dicarboxylic acid (g/mol)
N: amino group concentration (eq/g)
C: carboxyl group concentration (eq/g).

The polyamide resins used in the present invention also preferably have a relative viscosity of 1.7 to 4.7, more preferably 2.05 to 4.3, even more preferably 2.45 to 3.9 as determined at a resin concentration of 1 g/100 cc in 96% sulfuric acid at a temperature of 25° C. Such ranges are preferred because moldability tends to improve.

[Polyamide Resin Moldings]

The polyamide resins described above or polyamide resin compositions containing them are formed into molded products in various shapes by various molding processes.

Examples of molding processes include, for example, injection molding, blow molding, extrusion molding, compression molding, vacuum molding, press molding, direct blow molding, rotational molding, sandwich molding, two-color molding, melt spinning and the like.

The polyamide resin moldings of the present invention are characterized in that they have a crystallinity index of 0 to 50%. The crystallinity index is preferably 0 to 30%, more preferably 0 to 15%, even more preferably 0 to 5%. The crystallinity index in such ranges is preferred because the moldings have excellent mechanical strength and the decrease in mechanical properties such as elastic modulus during wetting can be reduced so that the properties of the moldings can be maintained for a long period.

The crystallinity index of the moldings can be controlled by, for example, regulating the molding temperature, mold temperature or the like. Specifically when the moldings are injection-molded articles, their crystallinity index can be controlled by holding the molten resin in a mold at a cylinder temperature of 170 to 350° C. and a mold temperature of 10 to 150° C. for several seconds to several tens of seconds, specifically 1 to 60 seconds. The mold temperature is preferably 80 to 150° C., more preferably 90 to 130° C. When it is in the above ranges, a desired crystallinity index can be maintained.

When the moldings are films or sheets, they can be provided with a desired crystallinity index by regulating the temperature of the touch roll at 80 to 150° C. and controlling the take-up speed. The take-up speed depends on the screw diameter and torque of the extruder and the size of the film or sheet, but typically preferably ranges from 1 to 50 m/min when xylylenediamine (A) consists of 100 mol % of m-xylylenediamine. It preferably ranges from 5 to 100 m/min, more preferably 10 to 100 m/min when xylylenediamine (A) is a mixture of 0 to 70 mol % of m-xylylenediamine and 100 to 30 mol % of p-xylylenediamine. When the moldings are tubes or fibers or the like, the crystallinity index can be controlled by cooling the molten resin with air or water at a cooling temperature of 30 to 90° C.

Regardless of the type of molded product, the inlet temperature (Tin) and the outlet temperature (Tout) of a cylinder in which a resin is melted should preferably satisfy the relation (1) below:

$$Tout \geq Tin+20° C. \qquad (1).$$

The crystallinity index can be controlled by regulating the temperatures at the inlet and the outlet of the cylinder to satisfy this relation.

The inlet temperature (Tin) and the outlet temperature (Tout) of the cylinder should also satisfy the relations (2) and (3) below with the melting point (Tm) of the polyamide resin:

$$Tm+60° C. \geq Tout \geq Tm+10° C. \qquad (2)$$

$$Tm+40° C. \geq Tin \geq Tm-50° C. \qquad (3);$$

more preferably $$Tm+40° C. \geq Tout \geq Tm+15° C.$$

$$Tm+20° C. \geq Tin \geq Tm-40° C.;$$

especially preferably $$Tm+30° C. \geq Tout \geq Tm+20° C.$$

$$Tm+10° C. \geq Tin \geq Tm-30° C.$$

It is thought that such ranges prevent the polyamide resin from being excessively melted and allow crystal nuclei from which crystallization starts to exist in proper amounts in the molten resin, which promotes crystallization and helps to control the crystallinity index of the molded product.

Regardless of the type of molded product, the screw on which a resin is melted preferably has a compression ratio of 2 to 4, more preferably 2.2 to 3.6 because it promotes crystallization of the polyamide, resin and helps to control the crystallinity index of the molded product. The screw also preferably has a ratio of the length of the compression section to the overall length (from the feed section to the end of the compression section) of 0.1 to 0.25, more preferably 0.11 to 0.2, even more preferably 0.11 to 0.15. A screw having a compression ratio and a compression sector length in such ranges is preferably used because it allows crystal nuclei from which crystallization starts to exist in proper amounts in the molten resin, which promotes crystallization and helps to control the crystallinity index of the molded product.

Regardless of the type of molded product, the crystallinity index of a molded product can also be controlled by subjecting the molded product to heat treatment (crystallization treatment) by holding it at a temperature equal to or higher than the glass transition point (g) of the polyamide resin for several minutes to several hours to promote crystallization. The holding temperature is preferably Tg plus 20° C. to Tm minus 20° C., more preferably Tg plus 40° C. to Tm minus 40° C., even more preferably Tg plus 60° C. to Tm minus 60° C.

Regardless of the type of molded product, the crystallinity index of a molded product can also be controlled by adjusting the moisture content of the polyamide resin before molding. The moisture content of the polyamide resin before molding can be adjusted by known methods. For example, the polyamide resin may be dried at a temperature of 60 to 180° C., preferably 80 to 150° C. for e.g., 2 hours or more, preferably 3 hours or more upto about 24 hours. It may be dried under reduced pressure or at atmospheric pressure, preferably under reduced pressure. It may be dried in any atmosphere including air, nitrogen, inert gas or the like. When dehumanized air is used, the polyamide resin is preferably dried at 100° C. or less, more preferably 90° C. or less to prevent it from discoloration. Dryers that can be used include ventilation dryers, rotary dryers, fluid bed dryers, agitated dryers equipped with agitator blades and the like. Polyamide resins having an appropriate moisture content before molding allow crystallization to be promoted during molding processes. The polyamide resins preferably have a moisture content of 0.02 to 0.15% by mass, more preferably 0.03 to 0.10% by mass, even more preferably 0.04 to 0.09% by mass.

As used herein, the crystallinity index of a polyamide resin molding is calculated using a differential scanning calorimeter from the equation below:

Crystallinity index (%)=$(Q_c/Q_m)\times 100$ wherein $Q_m$ represents the heat of fusion of the polyamide resin molding and $Q_c$ represents the heat of crystallization of the polyamide resin molding during heating.

Specifically, a sample of about 10 mg is cut out from a molded product and analyzed using the differential scanning calorimeter DSC-50 available from SHIMADZU Corporation by the method below:
Standard: α-alumina
Sample size: about 10 mg
Heating rate: 10° C./min
Test temperature range: 25 to 300° C.
Atmosphere: nitrogen gas at 30 ml/min.

It should be understood that the heat of fusion is the amount of heat absorbed by a unit weight of a molded product when a resin is melted and that the heat of crystallization is the amount of heat evolved by a unit weight of a molded product when a resin crystallizes during heating. It can be said that the molded product has higher degree of crystallinity when the value of the crystallinity index is lower.

The polyamide resin moldings of the present invention are also characterized in that they have a moisture content of 0.1 to 2%.

The polyamide resin moldings preferably have a moisture content of 0.2 to 1.8% by mass, more preferably 0.3 to 1.4% by mass, even more preferably 0.4 to 1% by mass. When the moisture content is in the above ranges and the crystallinity index is in the above ranges at the same time, the polyamide resin moldings of the present invention surprisingly can maintain high mechanic strength such as elastic modulus. This fact radically overturns the conventional view that polyamide resins suffer strength loss when they absorb water.

If the moisture content of the polyamide resin moldings is less than 0.1%, the moldings lack strength and tenacity so that they cannot maintain high mechanical strength and become susceptible to cracking or the like. If it exceeds 2%, mechanical strength retention decreases, and therefore, mechanical strength decreases during long-term use.

The moisture content can be controlled by maintaining the polyamide resin moldings at a humidity of 50 to 100% RH under conditions of 20° C. to 60° C. to wet them or maintaining them in water to wet them optionally followed by drying by heating. Alternatively, the polyamide resin moldings can be controlled to a desired moisture content by introducing them with water or steam into a heater and heating them to, for example, 40 to 150° C., though the present invention is not limited to these specific methods.

As used herein, the moisture content of a polyamide resin molding can be determined by the Karl Fischer method, specifically by testing a specimen cut out from a molded product for the amount of moisture using the Karl Fischer Moisture Meter (ZQ-2000) available from Hiranuma Sangyo Co. Ltd. under vaporization conditions of a test temperature of the melting point of the polyamide resin minus 5° C. for 30 minutes to determine the moisture content.

[Molding Processes]

The polyamide resin moldings of the present invention can be prepared in a desired shape using the polyamide resins described above by, for example, any of the molding processes described above such as injection molding, blow molding, extrusion molding, compression molding, vacuum molding, press molding, direct blow molding, rotational molding, sandwich molding, two-color molding, melt spinning and the like. For example, an injection-molded product can be prepared by introducing a polyamide resin optionally blended with various additive components into an injection molding machine controlled at a cylinder temperature of about 200 to 350° C., where it is melted and filled into a mold of a desired shape.

For example, a sheet or film can be conventionally prepared by extrusion-molding a polyamide resin (or a composition thereof), specifically by using the flat-die extrusion process in which a polyamide resin composition is melted and continuously extruded from a flat die and molded into a film while it is cooled on a casting roll; or the water-cooled blown-film extrusion process in which a polyamide resin composition is continuously extruded from an annular die and cooled with water; or the air-cooled blown-film extrusion process in which a polyamide resin composition is also extruded from an annular die and cooled with air; or the like process. The sheet or film may also be laminated.

It should be noted that the sheets and films among the polyamide resin moldings of the present invention refer to those used in the conventional definition that classifies thicker ones as "sheets" and thinner ones as "films", and more strictly, those having a thickness of 0.1 mm or more as "sheets" and those having a thickness of less than 0.1 mm as "films".

Tubes and (profile) extrusions can also be prepared, and tubes can be drawn and then compressed in a mold into bellows tubes such as corrugated tubes or helically cut into spiral tubes or the like.

The polyamide resin moldings of the present invention provide xylylene sebacamide-based polyamide resin moldings having excellent mechanical strength such as elastic modulus and free from the problem of mechanical strength loss during long-term use by satisfying the criteria for crystallinity index and moisture content described above.

The relationship between these criteria and improvements in the performance of the moldings has not been well explained, but such excellent performance is achieved by controlling the crystallinity index and moisture content in the ranges defined herein. Although the exact mechanism has not been known, the following factors may be involved: the high degree of crystallinity of the polyamide resins used in the present invention prevents a decrease in elastic modulus even at high moisture levels; or the low concentration of amide groups to which water molecules are coordinated resists wetting and prevents a decrease in elastic modulus; or the low hygroscopicity of amorphous phases or other factors may be involved. In terms of molecular structure, it may be assumed that the presence of specific amounts of xylylenediamine and sebacic acid may contribute to a unique crystalline structure with little decrease in properties even during wetting, but the exact mechanism has not been known at present.

[Other Additives and the Like]

The polyamide resins used in the polyamide resin moldings of the present invention can be combined with various additives as appropriate to form polyamide resin compositions so far as the object of the present invention is not affected. Specifically, they can be combined with, for example, organic stabilizers such as phosphorus stabilizers, hindered phenol stabilizers, hindered amine stabilizers, organic sulfur stabilizers, oxanilide stabilizers and secondary aromatic amine stabilizers; inorganic stabilizers such as copper compounds and halides; inorganic fillers such as glass fillers (glass fibers, milled glass fibers (milled fibers), glass flakes, glass beads, etc.), calcium silicate fillers (wollastonite, etc.), mica, talc, kaolin, potassium titanate whiskers, boron nitride and carbon fibers; nucleating agents such as talc and boron nitride; hydrolysis resistance improvers such as carbodiimide compounds; conductive agents; lubricants; plasticizers; release agents; pigments; dyes; dispersing agents; antistatic agents; UV absorbers; shock resistance improvers; flame retardants; and other well-known additives.

For example, glass fillers are preferably contained in an amount of 5 to 200 parts by mass, more preferably 10 to 150 parts by mass, even more preferably 20 to 100 parts by mass per 100 parts by mass of a polyamide resin. Inorganic fillers are preferably contained in an amount of 0.1 to 100 parts by mass, more preferably 0.5 to 50 parts by mass, even more preferably 1 to 30 parts by mass per 100 parts by mass of a polyamide resin. Nucleating agents are preferably contained in an amount of 0.1 to 100 parts by mass, more preferably 0.5 to 50 parts by mass, even more preferably 1 to 30 parts by mass per 100 parts by mass of a polyamide resin. Release agents are preferably contained in an amount of 0.1 to 10 parts by mass, more preferably 0.2 to 8 parts by mass, even more preferably 0.5 to 5 parts by mass per 100 parts by mass of a polyamide resin.

Other resins than the polyamide resins described above can also be contained so far as the benefits of the present invention are not affected. In this case, such other resins are preferably contained in an amount of 5 to 200 parts by mass, more preferably 10 to 150 parts by mass, even more preferably 20 to 100 parts by mass per 100 parts by mass of a polyamide resin.

Among these additives, carbodiimide compounds (C) as hydrolysis resistance improvers are preferably contained. Carbodiimide compounds preferably include aromatic, aliphatic or alicyclic polycarbodiimide compounds prepared by various processes. Among them, aliphatic or alicyclic polycarbodiimide compounds are preferred in terms of melt kneadability during extrusion or the like, and alicyclic polycarbodiimide compounds are more preferably used.

These carbodiimide compounds (C) can be prepared by decarboxylative condensation of organic polyisocyanates. For example, they can be synthesized by decarboxylative condensation of various organic polyisocyanates at a temperature of about 70° C. or more in an inert solvent or without using a solvent in the presence of a carbodiimidation catalyst. The isocyanate content is preferably 0.1 to 5%, more preferably 1 to 3%. The content in the above ranges tends to facilitate the reaction with the polyamide resins and to improve hydrolysis resistance.

Organic polyisocyanates that can be used as starting materials for synthesizing the carbodiimide compounds (C) include, for example, various organic diisocyanates such as aromatic diisocyanates, aliphatic diisocyanates and alicyclic diisocyanates and mixtures thereof.

Examples of organic diisocyanates specifically include 1,5-naphthalene diisocyanate, 4,4'-diphenylmethanediisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, hexamethylene diisocyanate, cyclohexane-1,4-diisocyanate, xylylene diisocyanate, isophorone diisocyanate, dicyclohexylmethane-4,4-diisocyanate, methylcyclohexane diisocyanate, tetramethylxylylene diisocyanate, 2,6-diisopropylphenyl isocyanate, 1,3,5-triisopropylbenzene-2,4-diisocyanate, methylenebis(4,1-cyclohexylene)diisocyanate and the like, and two or more of them can be used in combination. Among them, dicyclohexylmethane-4,4-diisocyanate and methylenebis(4,1-cyclohexylene)diisocyanate are preferred.

To cap the ends of the carbodiimide compounds (C) to control their degree of polymerization, terminal blocking agents such as monoisocyanates are also preferably used. Monoisocyanates include, for example, phenyl isocyanate, tolyl isocyanate, dimethylphenyl isocyanate, cyclohexyl isocyanate, butyl isocyanate, naphthyl isocyanate and the like, and two or more of them can be used in combination.

The terminal blocking agents are not limited to the monoisocyanates mentioned above, but may be any active hydrogen compounds capable of reacting with isocyanates. Examples of such active hydrogen compounds may include aliphatic, aromatic or alicyclic compounds having an —OH group such as methanol, ethanol, phenol, cyclohexanol, N-methylethanolamine, polyethylene glycol monomethyl ether and polypropylene glycol monomethyl ether; secondary amines such as diethylamine and dicyclohexylamine; primary amines such as butylamine and cyclohexylamine; carboxylic acids such as succinic acid, benzoic acid and cyclohexanecarboxylic acid; thiols such as ethyl mercaptan, allyl mercaptan and thiophenol; compounds having an epoxy group and the like, and two or more of them can be used in combination.

Carbodiimidation catalysts that can be used include, for example, phospholene oxides such as 1-phenyl-2-phospholene-1-oxide, 3-methyl-1-phenyl-2-phospholene-1-oxide, 1-ethyl-2-phospholene-1-oxide, 3-methyl-2-phospholene-1-oxide and 3-phospholene isomers thereof; metal catalysts such as tetrabutyl titanate and the like, among which 3-methyl-1-phenyl-2-phospholene-1-oxide is preferred because of reactivity. Two or more of the carbodiimidation catalysts may be used in combination.

The content of the carbodiimide compounds (C) is preferably 0.1 to 2 parts by mass, more preferably 0.1 to 1.5 parts by mass, even more preferably 0.2 to 1.5 parts by mass per 100 parts by mass, especially more preferably 0.3 to 1.5 parts by mass of a polyamide resin. If it is less than 0.1 part by mass, the hydrolysis resistance of the polyamide resin is insufficient so that uneven delivery is more likely to occur during melt kneading such as extrusion, leading to insufficient melt kneading. If it exceeds 2 parts by mass, however, the viscosity of the resin during melt kneading significantly increases, which may impair melt kneadability and moldability.

EXAMPLES

The following examples and comparative examples further illustrate the present invention, but the present invention should not be construed as being limited to these examples.

Analyses for evaluation herein were performed by the following methods.

[Evaluation Methods]

Specimens prepared by molding the polyamide resins or polyamide resin compositions of Examples 1 to 14 and Comparative examples 1 to 5 were evaluated for the properties (1) to (4) below.

(1) Flexural Strength (Expressed in MPa)

The polyamide resins or polyamide resin compositions obtained by the procedures described below were used in the formulations and under the molding conditions described in Tables 1 to 3 below in the injection molding machine 100T available from FANUC Corporation to prepare specimens (ISO specimen having a thickness of 4 mm). Before molding, the resin compositions of Examples 2, 5 to 8, 11 and 12 were dried with dehumidified air (dew point −40° C.) at 80° C. for 8 hours, while the other polyamide resins were dried under vacuum at 150° C. for 5 hours.

The specimens obtained were subjected to heat treatment (crystallization treatment) under the conditions described in the tables and their flexural strength (in MPa) was determined according to JIS K7171 using the tensile strength tester "Strograph" available from Toyo Seiki Seisaku-sho, Ltd. at a test temperature of 23° C. and a test humidity of 50% RH and reported as flexural strength before wetting.

The specimens obtained by injection molding following the procedure described above were subjected to heat treatment and wet treatment under the conditions described in Tables 1 to 3 and then their flexural strength was determined by the method described above and reported as flexural strength after wetting. The term "none" in the cells in the rows under the heading "heat treatment conditions" or "wet treatment conditions" in the tables means that any heat treatment or wet treatment was not performed (in the same manner as in (2) to (4) below).

(2) Flexural Modulus (Expressed in GPa)

The polyamide resins or polyamide resin compositions obtained by the procedures described below were used in the formulations and under the molding conditions described in Tables 1 to 3 below in the injection molding machine 100T available from FANUC Corporation to prepare specimens (ISO specimen having a thickness of 4 mm). Before molding, the resin compositions of Examples 2, 5 to 8, 11 and 12 were dried with dehumidified air (dew point −40° C.) at 80° C. for 8 hours, while the other polyamide resins were dried under vacuum at 150° C. for 5 hours.

The specimens obtained were subjected to heat treatment (crystallization treatment) under the conditions described in Tables 1 to 3 and their flexural modulus (in GPa) was determined according to JIS K7171 using Strograph available from Toyo Seiki Seisaku-sho, Ltd. at a test temperature of 23° C. and a test humidity of 50% RH and reported as flexural modulus before wetting.

The specimens obtained by injection molding following the procedure described above were subjected to heat treatment and wet treatment under the conditions described in Tables 1 to 3 and then their flexural modulus was determined by the method described above and reported as flexural modulus after wetting.

(3) Crystallinity Index (Expressed in %)

The polyamide resins or polyamide resin compositions obtained by the procedures described below were used in the formulations and under the molding conditions described in Tables 1 to 3 below in the injection molding machine 100T available from FANUC Corporation to prepare specimens (having dimensions of 125×13 mm and a thickness of 1 mm for Examples 2, 5 to 8, 11 and 12 or a thickness of 4 mm for the others). Before molding, the resin compositions of Examples 2, 5 to 8, 11 and 12 were dried with dehumidified air (dew point −40° C.) at 80° C. for 8 hours, while the other polyamide resins were dried under vacuum at 150° C. for 5 hours.

The specimens obtained were subjected to heat treatment (crystallization treatment) and wet treatment under the conditions described in Tables 1 to 3 and then their crystallinity index was calculated by differential scanning calorimetry from the equation below:

Crystallinity index (%)=$(Q_c/Q_m) \times 100$ wherein $Q_m$ represents the heat of fusion of the polyamide resin molding and $Q_c$ represents the heat of crystallization of the polyamide resin molding during heating.

Specifically, a sample of about 10 mg was cut out from each specimen and analyzed using the differential scanning calorimeter DSC-50 available from SHIMADZU Corporation by the method below:
Standard: α-alumina
Sample size: about 10 mg
Heating rate: 10° C./min
Test temperature range: 25 to 300° C.
Atmosphere: nitrogen gas at 30 ml/min.

(4) Moisture Content (Expressed in %)

Specimens obtained by injection molding following the procedure described for the evaluation of crystallinity index in (3) above were subjected to heat treatment (crystallization treatment) under the conditions described in Tables 1 to 3. A sample of about 0.5 g was cut out from each of the specimens and tested for the amount of moisture using the Karl Fischer Moisture Meter (ZQ-2000) available from Hiranuma Sangyo Co. Ltd. under vaporization conditions of a test temperature of the melting point of the polyamide resin minus 5° C. for 30 minutes to determine the moisture content in the specimen before wetting.

The specimens obtained by injection molding following the procedure described above were subjected to heat treatment and wet treatment under the conditions described in Tables 1 to 3 and then their moisture content was determined by the method described above and reported as moisture content after wetting.

[Starting Materials]

Xylylene Sebacamide-Based Polyamide Resins:

The xylylene sebacamide-based polyamide resins used were the polyamide resins-1 to −6 obtained in Preparation examples 1 to 6 below ("Polyamide-1" to "Polyimide-6").

Preparation Example 1

A reaction vessel having an internal volume of 50 liters equipped with a stirrer, a partial condenser, a total condenser, a thermometer, a dropping device and a nitrogen inlet as well as a strand die was charged with precisely weighed 8950 g (44.25 mol) of sebacic acid, 12.54 g (0.074 mol) of calcium hypophosphite, and 6.45 g (0.079 mol) of sodium acetate (in a molar equivalent ratio of 1.0 between calcium hypophosphite and sodium acetate). The inside of the reaction vessel was thoroughly purged with nitrogen and then pressurized with nitrogen to 0.3 MPa and heated to 160° C. with stirring to homogeneously melt sebacic acid. Then, 6026 g (44.24 mol) of p-xylylenediamine was added dropwise with stirring over 170 minutes. During then, the internal temperature was continuously raised to 281° C. During the dropwise addition step, the pressure was controlled at 0.5 MPa and the water generated was removed outside the system through the partial condenser and the total condenser. The temperature in the partial condenser was controlled in the range of 145 to 147° C. After completion of the dropwise addition of p-xylylenediamine, the pressure was lowered at a rate of 0.4 MPa/hr to atmospheric pressure over 60 minutes. During then, the internal temperature rose to 299° C. Then, the pressure was lowered at a rate of 0.002 MPa/min to 0.08 MPa over 20 minutes. Then, the reaction was continued at 0.08 MPa until the torque of the stirrer reached a predetermined value. The reaction period at 0.08 MPa was 10 minutes. Then, the inside of the system was pressurized with nitrogen, and the resulting polymer was collected from the strand die and pelletized to give about 13 kg of polyamide resin-1 (hereinafter referred to as "polyamide-1").

Polyamide-1 had a melting point of 281° C., a glass transition point of 75.0° C., a number average molecular weight of 14,493, a relative viscosity of 2.19 (as determined at a resin concentration of 1 g/100 cc in 96% sulfuric acid at a temperature of 25° C.), a terminal amino group concentration of 55.3 µeq/g, and a terminal carboxyl group concentration of 82.7 µeq/g.

Preparation Example 2

Polyamide resin-2 (hereinafter referred to as "polyamide-2") was obtained in the same manner as in Preparation example 1 except that m-xylylenediamine and p-xylylenediamine were mixed in the ratio described in the tables.

Polyamide-2 had a melting point of 263° C., a glass transition point of 70.0° C., a number average molecular weight of 12,285, a relative viscosity of 2.15 (as determined at a resin concentration of 1 g/100 cc in 96% sulfuric acid at a temperature of 25° C.), a terminal amino group concentration of 43.8 µeq/g and a terminal carboxyl group concentration of 119 µeq/g.

Preparation Example 3

A reaction vessel equipped with a stirrer, a partial condenser, a total condenser, a thermometer, a dropping funnel and a nitrogen inlet as well as a strand die was charged with precisely weighed 12,135 g (60 mol) of sebacic acid, 3.105 g of sodium hypophosphite monohydrate (NaH$_2$PO$_2$.H$_2$O) (50 ppm expressed as the phosphorus atom concentration in the polyamide resin) and 1.61 g of sodium acetate, and thoroughly purged with nitrogen and then heated to 170° C. while stirring the inside of the system under a small amount of a nitrogen gas stream. The molar ratio of sodium acetate/sodium hypophosphite monohydrate was 0.67.

To this was added dropwise 8,172 g (60 mol) of a 5:5 diamine mixture of m-xylylenediamine and p-xylylenediamine with stirring and the inside of the system was continuously heated while the condensed water generated was removed outside the system. After completion of the dropwise addition of the xylylenediamine mixture, melt polymerization reaction was continued for 40 minutes at an internal temperature of 260° C.

Then, the inside of the system was pressurized with nitrogen, and the resulting polymer was collected from the strand die and pelletized to give about 24 kg of polyamide resin-3 (hereinafter referred to as "polyamide-3").

Polyamide-3 had a melting point of 234° C., a glass transition point of 67.0° C., a number average molecular weight of 20,000, a relative viscosity of 2.45 (as determined at a resin concentration of 1 g/100 cc in 96% sulfuric acid at a temperature of 25° C.), a terminal amino group concentration of 15.0 µeq/g, and a terminal carboxyl group concentration of 85.0 µeq/g.

Preparation Examples 4 to 6

Polyamide resins-4 to −6 (hereinafter referred to as "polyamide-4" to "polyamide −6") were obtained in the same manner as in Preparation example 3 except that m-xylylenediamine and p-xylylenediamine were mixed in the ratios described in the tables.

Polyamide-4 had a melting point of 224° C., a glass transition point of 66.5° C., a number average molecular weight of 18,182, a relative viscosity of 2.33 (as determined at a resin concentration of 1 g/100 cc in 96% sulfuric acid at a temperature of 25° C.), a terminal amino group concentration of 20.0 µeq/g, and a terminal carboxyl group concentration of 90.0 µeq/g.

Polyamide-5 had a melting point of 212° C., a glass transition point of 64.4° C., a number average molecular weight of 14,286, a relative viscosity of 2.09 (as determined at a resin concentration of 1 g/100 cc in 96% sulfuric acid at a temperature of 25° C.), a terminal amino group concentration of 60.0 µeq/g, and a terminal carboxyl group concentration of 80.0 µeq/g.

Polyamide-6 had a melting point of 191° C., a glass transition point of 60.0° C., a number average molecular weight of 15,221, a relative viscosity of 2.27 (as determined at a resin concentration of 1 g/100 cc in 96% sulfuric acid at a temperature of 25° C.), a terminal amino group concentration of 55.6 µeq/g, and a terminal carboxyl group concentration of 75.8 µeq/g.

Other Polyamide Resins:

Polyamide 6:

The product available from Ube Industries, Ltd. under the brand name "UBE Nylon 1015B" having a melting point of 220° C., a glass transition point of 46° C. and a number average molecular weight of 15,000 (the values reported by the manufacturer).

Polyamide 610:

The product available from Toray Industries, Inc. under the brand name "AMILAN CM2001" having a melting point of 225° C.

Other Additives:

Elastomer:

An elastomer prepared under the conditions described below was used.

A styrene-ethylene-butylene-styrene block copolymer (SEBS), maleic anhydride and a radical initiator were homogeneously mixed in a Henschel mixer, and then melted using a twin-screw extruder (screw diameter 30 mm, L/D=42) at a cylinder temperature of 230° C. and a screw speed of 300 rpm and pelletized to give a modified hydrogenated block copolymer (hereinafter abbreviated as "modified SEBS"). The maleic anhydride used was a product available from Mitsubishi Chemical Corporation, and the radical initiator used was 1,3-bis(2-t-butylperoxypropyl)benzene available from Kayaku Akzo Corporation under the brand name "Perkadox 14" (10 hr half-life temperature 121° C.). The resulting modified SEBS was dried by heating under reduced pressure and then the amount of maleic anhydride added was determined to be 0.5% by mass by titration with sodium methylate.

Carbodiimide Compound:

The alicyclic polycarbodiimide compound available from Nisshinbo Chemical Inc. under the brand name "CARBODILITE LA-1".

Glass Fiber:

Chopped strands available from Nippon Electric Glass Co., Ltd. under the brand name "T-275H".

Talc:

The product available from Hayashi Kasei Co., Ltd. under the brand name "MICRON WHITE #5000S".

Release Agent:

Calcium montanate available from Clariant (Japan) K.K. under the brand name "Licomont CAV 102".

Examples 1, 3, 4, 9, 10, 13 and 14

Polyamide-1 to polyamide-3 and polyamide-6 obtained in Preparation examples 1 to 3 and 6 described above and the other components were weighed in the formulations shown in Tables 1 to 2 below, and blended in a tumbler and then molded under the conditions described above and the conditions described in Tables 1 to 2 using the injection molding machine 100T available from FANUC Corporation to prepare molded products (specimens), which were evaluated as described in (1) to (4) above. The results are shown in Tables 1 to 2 below.

Examples 2, 5 to 8, 11 and 12

Polyamide-1, polyamide-4 and polyamide-5 obtained in Preparation examples 1, 4 and 5 described above and the other components were weighed in the formulations shown in Tables 1 to 2 below, and all the components excluding the glass fiber were blended in a tumbler and introduced into the main feed section of a twin-screw extruder ("TEM26SS" available from TOSHIBA MACHINE CO., LTD.) and melted, and then the glass fiber was supplied into the side feed section. The extruder was set at a temperature of 300° C. from the main feed section to the side feed section and 290° C. from the side feed section to the outlet and the melt was kneaded by extrusion and pelletized to prepare pellets of the polyamide resin compositions. The resulting pellets of the polyamide resin compositions were molded under the conditions described above and the conditions described in Tables 1 to 2 using the injection molding machine 100T available from FANUC Corporation to prepare molded products (specimens), which were evaluated as described in (1) to (4) above. The results are shown in Tables 1 to 2 below.

TABLE 1

|  |  |  | Example |  |  |  |  |  |  |
|---|---|---|---|---|---|---|---|---|---|
|  |  |  | 1 | 2 | 3 | 4 | 5 | 6 | 7 |
| Xylylene sebacamide-based polyamide resin | PXDA | mol % | 100 | 100 | 80 | 50 | 30 | 40 | 30 |
|  | MXDA | mol % |  |  | 20 | 50 | 70 | 60 | 70 |
|  | Sebacic acid | mol % | 100 | 100 | 100 | 100 | 100 | 100 | 100 |
| Formulation |  |  |  |  |  |  |  |  |  |
| Polyamide-1 | parts by mass |  | 100 | 100 |  |  |  |  |  |
| Polyamide-2 | parts by mass |  |  |  | 100 |  |  |  |  |
| Polyamide-3 | parts by mass |  |  |  |  | 100 |  |  |  |
| Polyamide-4 | parts by mass |  |  |  |  |  |  | 100 |  |
| Polyamide-5 | parts by mass |  |  |  |  |  | 100 |  | 100 |
| Polyamide-6 | parts by mass |  |  |  |  |  |  |  |  |
| Polyamide 6 | parts by mass |  |  |  |  |  |  |  |  |
| Polyamide 610 | parts by mass |  |  |  |  |  |  |  |  |
| Carbodiimide | parts by mass |  |  |  |  |  |  |  |  |
| Modified SEBS | parts by mass |  |  | 9.1 |  |  | 9.3 | 9.3 | 9.1 |
| Glass fiber | parts by mass |  |  | 73 |  |  | 74 | 74 | 73 |
| Talc | parts by mass |  |  |  |  |  | 1.9 | 1.9 |  |
| Release agent | % by mass |  |  | 0.55 |  |  | 0.56 | 0.56 | 0.55 |
| Molding conditions |  |  |  |  |  |  |  |  |  |
| Inlet temperature (Tin) | ° C. |  | 280 | 290 | 240 | 220 | 200 | 200 | 200 |
| Outlet temperature (Tout) | ° C. |  | 310 | 310 | 280 | 250 | 250 | 225 | 240 |
| Mold temperature | ° C. |  | 30 | 90 | 50 | 50 | 100 | 90 | 110 |
| Heat treatment conditions |  |  | 150° C. × 1 hr | none | 150° C. × 1 hr | 150° C. × 1 hr | none | none | none |
| Heat of crystallization | J/g |  | 0 | 0.2 | 0 | 0 | 0.9 | 6.7 | 0.7 |
| Heat of fusion | J/g |  | 70 | 38 | 65 | 52 | 24 | 26 | 24 |
| Crystallinity index | % |  | 0 | 0.5 | 0 | 0 | 3.8 | 25.8 | 2.9 |
| Wet treatment conditions | Water or atmosphere |  | 23° C. in water | 23° C. in water | 23° C. in water | 23° C. in water | 23° C. in water | 40° C. 75% RH | 40° C. 90% RH |
|  | Period (days) |  | 28 | 1 | 7 | 1 | 14 | 4 | 10 |
| Moisture content | before wetting | % | 0.08 | 0.05 | 0.08 | 0.08 | 0.06 | 0.07 | 0.05 |
|  | after wetting | % | 0.90 | 0.10 | 0.25 | 0.15 | 0.35 | 0.50 | 1.5 |
| Flexural strength | before wetting | MPa | 122 | 287 | 125 | 130 | 276 | 274 | 285 |
|  | after wetting | MPa | 115 | 258 | 120 | 115 | 250 | 272 | 241 |
| Flexural modulus | before wetting | GPa | 2.88 | 11.9 | 2.80 | 2.75 | 11.7 | 11.6 | 11.5 |
|  | after wetting | GPa | 2.96 | 11.9 | 2.80 | 2.55 | 11.0 | 11.5 | 10.7 |

TABLE 2

|  |  |  | Example | | | | | | |
|---|---|---|---|---|---|---|---|---|---|
|  |  |  | 8 | 9 | 10 | 11 | 12 | 13 | 14 |
| Xylylene sebacamide-based polyamide resin | PXDA | mol % | 40 |  |  | 30 | 40 | 100 | 100 |
|  | MXDA | mol % | 60 | 100 | 100 | 70 | 60 |  |  |
|  | Sebacic acid | mol % | 100 | 100 | 100 | 100 | 100 | 100 | 100 |
| Formulation |  |  |  |  |  |  |  |  |  |
| Polyamide-1 | parts by mass |  |  |  |  |  |  | 100 | 100 |
| Polyamide-2 | parts by mass |  |  |  |  |  |  |  |  |
| Polyamide-3 | parts by mass |  |  |  |  |  |  |  |  |
| Polyamide-4 | parts by mass |  | 100 |  |  |  | 100 |  |  |
| Polyamide-5 | parts by mass |  |  |  |  | 100 |  |  |  |
| Polyamide-6 | parts by mass |  |  | 100 | 100 |  |  |  |  |
| Polyamide 6 | parts by mass |  |  |  |  |  |  |  |  |
| Polyamide 610 | parts by mass |  |  |  |  |  |  |  |  |
| Carbodiimide | parts by mass |  |  |  |  | 0.5 |  |  |  |
| Modified SEBS | parts by mass |  | 9.1 |  |  |  | 9.3 | 9.3 |  |
| Glass fiber | parts by mass |  | 73 |  |  |  | 74 | 74 |  |
| Talc | parts by mass |  |  |  |  |  | 1.9 | 1.9 |  |
| Release agent | % by mass |  | 0.55 |  |  |  | 0.56 | 0.56 |  |
| Molding conditions |  |  |  |  |  |  |  |  |  |
| Inlet temperature, (Tin) |  | ° C. | 190 | 180 | 180 | 200 | 200 | 290 | 290 |
| Outlet temperature (Tout) |  | ° C. | 235 | 230 | 230 | 240 | 225 | 310 | 310 |
| Mold temperature |  | ° C. | 100 | 30 | 30 | 110 | 80 | 90 | 90 |
| Heat treatment conditions |  |  | none | 150° C. × 1 hr | 150° C. × 1 hr | none | none | none | none |
| Heat of crystallization |  | J/g | 0.6 | 0 | 0 | 1.2 | 11.1 | 0.2 | 0.2 |
| Heat of fusion |  | J/g | 26 | 35 | 35 | 24 | 26 | 70 | 70 |
| Crystallinity index |  | % | 2.3 | 0 | 0 | 5.0 | 42.7 | 0.3 | 0.3 |
| Wet treatment conditions | Water or atmosphere |  | 50° C. 80% RH | 60° C. 90% RH | 60° C. 90% RH | 23° C. in water | 40° C. 75% RH | 23° C. in water | 23° C. in water |
|  | Period (days) |  | 3 | 2 | 2 | 14 | 4 | 7 | 14 |
| Moisture content | before wetting | % | 0.08 | 0.08 | 0.08 | 0.06 | 0.07 | 0.08 | 0.08 |
|  | after wetting | % | 0.40 | 0.70 | 0.70 | 0.36 | 0.53 | 0.50 | 0.67 |
| Flexural strength | before wetting | MPa | 282 | 136 | 136 | 276 | 274 | 122 | 122 |
|  | after wetting | MPa | 265 | 111 | 125 | 245 | 240 | 121 | 119 |
| Flexural modulus | before wetting | GPa | 11.4 | 3.24 | 3.24 | 11.7 | 11.6 | 2.88 | 2.88 |
|  | after wetting | GPa | 11.0 | 2.82 | 3.01 | 10.8 | 10.5 | 2.91 | 2.94 |

Comparative examples 1 to 5

The polyamide 6 and polyamide 610 described above and polyamide-1, polyamide-5 and polyamide-6 obtained in Preparation examples 1, 5 and 6 above were used as polyamide resins and molded under the conditions described above and the conditions described in Table 3 to prepare molded products (specimens), which were evaluated as described in (1) to (4) above. The results are shown in Table 3 below.

TABLE 3

|  |  |  | Comparative example | | | | |
|---|---|---|---|---|---|---|---|
|  |  |  | 1 | 2 | 3 | 4 | 5 |
| Xylylene sebacamide-based polyamide resin | PXDA | mol % |  |  | 100 | 30 |  |
|  | MXDA | mol % |  |  |  | 70 | 100 |
|  | Sebacic acid | mol % |  |  | 100 | 100 | 100 |
| Formulation |  |  |  |  |  |  |  |
| Polyamide-1 | parts by mass |  |  |  | 100 |  |  |
| Polyamide-2 | parts by mass |  |  |  |  |  |  |
| Polyamide-3 | parts by mass |  |  |  |  |  |  |
| Polyamide-4 | parts by mass |  |  |  |  |  |  |
| Polyamide-5 | parts by mass |  |  |  |  | 100 |  |
| Polyamide-6 | parts by mass |  |  |  |  |  | 100 |
| Polyamide 6 | parts by mass |  | 100 |  |  |  |  |

TABLE 3-continued

| | | | Comparative example | | | | |
|---|---|---|---|---|---|---|---|
| | | | 1 | 2 | 3 | 4 | 5 |
| Polyamide 610 | parts by mass | | | 100 | | | |
| Carbodiimide | parts by mass | | | | | | |
| Modified SEBS | parts by mass | | | | | | |
| Glass fiber | parts by mass | | | | | | |
| Talc | parts by mass | | | | | | |
| Release agent | % by mass | | | | | | |
| Molding conditions | | | | | | | |
| Inlet temperature (Tin) | | °C. | 220 | 220 | 280 | 200 | 230 |
| Outlet temperature (Tout) | | °C. | 260 | 260 | 310 | 240 | 230 |
| Mold temperature | | °C. | 30 | 30 | 60 | 30 | 70 |
| Heat treatment conditions | | | 150° C. × 1 hr | 150° C. × 1 hr | 150° C. × 24 hr | none | none |
| Heat of crystallization | | J/g | 0 | 0 | 0 | 40 | 37 |
| Heat of fusion | | J/g | 67 | 60 | 70 | 44 | 38 |
| Crystallinity index | | % | 0 | 0 | 0 | 90.9 | 97.4 |
| Wet treatment conditions | Water or atmosphere | | 23° C. in water | 23° C. in water | none | boiled water | 23° C. 90% RH |
| | Period | | 28 days | 28 days | | 24 hr | 1 day |
| Moisture content | before wetting | % | 0.11 | 0.09 | 0.03 | 0.08 | 0.08 |
| | after wetting | % | 6.3 | 1.4 | 0.03 | 2.5 | 0.15 |
| Flexural strength | before wetting | MPa | 113 | 81 | 100 | 100 | 86 |
| | after wetting | MPa | 25 | 41 | 100 | 75 | 65 |
| Flexural modulus | before wetting | GPa | 2.58 | 1.92 | 2.50 | 2.60 | 2.40 |
| | after wetting | GPa | 0.49 | 0.93 | 2.50 | 2.40 | 2.20 |

Example 15

Polyamide-6 obtained in Preparation example 6 was dried under vacuum at 150° C. for 5 hours, and extruded in a film forming machine comprising a single screw extruder having a screw of 30 mmϕ, L/D=24 and a ratio of the length of the compression section to the overall length (from the feed section to the end of the compression section) of 0.125 combined with a flat die under conditions of a screw inlet temperature of 180° C. and an outlet temperature of 240° C. and taken up with cooling under conditions of a roll temperature of 80° C. and a take-up speed of 10 m/min to give a film having a thickness of 100 μm. The resulting film was held at 130° C. in air atmosphere for 5 minutes.

Tensile properties of the film were tested according to JIS K7127 to determine elastic modulus and stress at break (in MPa) and reported as elastic modulus and breaking strength before wetting. The tests were performed by using Strograph available from Toyo Seiki Seisaku-sho, Ltd. under the following conditions: specimen width 10 mm, distance between chucks 50 mm, tensile speed 50 mm/min, test temperature 23° C. and test humidity 50% RH.

The film obtained by extrusion molding following the procedure described above was maintained under conditions of 23° C., 60% RH for 2 days and then subjected to tensile tests in the same manner to determine elastic modulus and breaking strength after wetting. Before wetting, the film had an elastic modulus of 2,000 MPa and a breaking strength of 53 MPa. After wetting, the elastic modulus was 1,950 MPa and the breaking strength was 50 MPa.

After wetting, the film had a heat of crystallization of 3 J/g, a heat of fusion of 34 J/g, and a crystallinity index of 8.8%. The moisture content was 0.20%.

INDUSTRIAL APPLICABILITY

The polyamide resin moldings of the present invention are excellent in mechanical strength such as elastic modulus and free from the problem of mechanical strength loss during long-term use so that they can be widely used as injection-molded articles, films, sheets, tubes, hoses, threads, fibers and the like in various applications and can be conveniently used for various films, sheets, laminated films, laminated sheets, tubes, hoses, pipes, various containers such as hollow containers and bottles, various parts/members, industrial resources, industrial materials and domestic goods, and therefore, they will find very wide industrial applicability.

The invention claimed is:

1. A polyamide resin molding, comprising:
a polyamide resin comprising a diamine structural unit and a dicarboxylic acid structural unit or a polyamide resin composition including the polyamide resin,
wherein 70 mol % or more of the diamine structural unit is derived from xylylenediamine and 50 mol % or more of the dicarboxylic acid structural unit is derived from sebacic acid, the polyamide resin molding has a crystallinity index of 0 to 50% and a moisture content of 0.1 to 2% by mass, and the xylylenediamine is a mixture of m-xylylenediamine and p-xylylenediamine,
wherein the crystallinity index is determined by formula:

$$\text{Crystallinity index (\%)} = (Qc/Qm) \times 100$$

where Qm is a heat of fusion of the polyamide resin molding, and Qc is a heat of crystallization of the polyamide resin molding during heating.

2. The polyamide resin molding according to claim 1, wherein the polyamide resin has a number average molecular weight of 8,000 to 50,000.

3. The polyamide resin molding according to claim 1, wherein the polyamide resin composition includes 0.1 to 2 parts by mass of a carbodiimide compound per 100 parts by mass of the polyamide resin.

4. The polyamide resin molding according to claim 1, which is a film, sheet, thread, tube or injection-molded article.

5. The polyamide resin molding according to claim 1, which is produced by a process comprising melting the polyamide resin or the polyamide resin composition in a cylinder under a condition satisfying a relation (1):

$$T_{out} \geq T_{in} + 20°\text{ C.} \quad (1),$$

where Tin is an inlet temperature of the cylinder, and Tout is an outlet temperature of the cylinder.

6. The polyamide resin molding according to claim 5, wherein the polyamide resin or the polyamide resin composition are melted in the cylinder under a condition satisfying relations (2) and (3):

$$T_m + 60°\text{ C.} \geq T_{out} \geq T_m + 10°\text{ C.} \quad (2)$$

$$T_m + 40°\text{ C.} \geq T_{in} \geq T_m - 50°\text{ C.} \quad (3),$$

where Tm is a melting point of the polyamide resin.

7. An injection-molded article, comprising:
the polyamide resin molding according to claim 1.

8. The polyamide resin molding according to claim 1, wherein the crystallinity index of the polyamide resin molding is 0 to 30%.

9. The polyamide resin molding according to claim 1, wherein the crystallinity index of the polyamide resin molding is 0 to 15%.

10. The polyamide resin molding according to claim 1, wherein the crystallinity index of the polyamide resin molding is 0 to 5%.

* * * * *